United States Patent [19]

Pavlath

[11] Patent Number: 5,037,205
[45] Date of Patent: Aug. 6, 1991

[54] INTEGRATED OPTIC INTERFEROMETRIC FIBER GYROSCOPE MODULE AND METHOD

[75] Inventor: George A. Pavlath, Thousand Oaks, Calif.

[73] Assignee: Litton Systems, Inc., Beverly Hills, Calif.

[21] Appl. No.: 412,228

[22] Filed: Sep. 25, 1989

Related U.S. Application Data

[63] Continuation of Ser. No. 183,607, Apr. 19, 1989, abandoned.

[51] Int. Cl.$^5$ ............................................. G01B 9/02
[52] U.S. Cl. ................................... 356/350; 385/14
[58] Field of Search ................... 356/350; 350/96.11

[56] References Cited

U.S. PATENT DOCUMENTS

| | | | |
|---|---|---|---|
| 4,265,514 | 5/1981 | Leclerc et al. | 356/350 |
| 4,400,088 | 8/1983 | Schiffner et al. | 356/350 |
| 4,468,085 | 8/1984 | Papuchon et al. | |
| 4,514,088 | 4/1985 | Coccoli | 356/350 |
| 4,591,269 | 5/1986 | Mohr | |
| 4,881,817 | 11/1989 | Kim et al. | 356/350 |

FOREIGN PATENT DOCUMENTS

| | | |
|---|---|---|
| 2121532A | 5/1982 | United Kingdom . |
| 2100855 | 1/1983 | United Kingdom ................ 356/350 |
| 2134248A | 1/1983 | United Kingdom . |
| 82/03456 | 3/1982 | World Int. Prop. O. . |

Primary Examiner—Samuel Turner
Attorney, Agent, or Firm—Lynn & Lynn

[57] ABSTRACT

An integrated optics chip which is the central module for an interferometric gyro. The invention configuration performs bias reduction, noise reduction, and improves scale factor linearity and repeatability. The chip is fabricated in an electro-optic material using conventional waveguide fabrication techniques, for example, titanium infusion into LiNbO$_3$. Light propagating into the chip from a source is split equally between two legs which are coupled to optical fibers. Similarly light propagating in the legs may be coupled together and the combined signal coupled into an optical fiber.

17 Claims, 6 Drawing Sheets

INTEGRATED OPTIC INTERFEROMETRIC FIBER GYROSCOPE MODULE AND METHOD

This is a continuation of copending application Ser. No. 183,607 filed on Apr. 19, 1989 and now abandoned.

BACKGROUND OF THE INVENTION

This invention relates generally to rotation sensors and particularly to fiber optic rotation sensors. More particularly, this invention relates to an integrated optics module that includes components for processing the optical input and output for an optical rotation sensor.

A fiber optic ring interferometer typically comprises a loop of fiber optic material that guides counter-propagating light waves. After traversing the loop, the counter-propagating waves are combined so that they constructively or destructively interfere to form an optical output signal. The intensity of the optical output signal varies as a function of the interference, which is dependent upon the relative phase of the counter-propagating waves.

Fiber optic ring interferometers have proven to be particularly useful for rotation sensing. Rotation of the loop creates a relative phase difference between the counter-propagating waves in accordance with the well known Sagnac effect. The amount of phase difference is a function of the angular velocity of the loop. The optical output signal produced by the interference of the counter-propagating waves varies in intensity as a function of the rotation rate of the loop. Rotation sensing is accomplished by detecting the optical output signal and processing it to determine the rotation rate.

In order to be suitable for inertial navigation applications, a rotation sensor must have a very wide dynamic range. The rotation sensor must be capable of detecting rotation rates as low as 0.01 degrees per hour and as high as 1,000 degrees per second. The ratio of the upper and lower limits to be measured is approximately $10^9$.

It is well known that in many fiber optic systems it may be desirable to have light of a known polarization state at selected points. The output of some components is polarization dependent. Therefore, having a known polarization input to such components minimizes errors. The state of polarization is particularly important in a device such as an optical fiber rotation sensor. In a polarized optical fiber rotation sensing system, drift errors due to changes in polarization are determined by the quality of the polarizer.

Some familiarity with polarization of light and propagation of light within an optical fiber will facilitate an understanding of the present invention. Therefore, a brief description of the concepts used to describe the propagation and polarization of a light wave in a fiber will be presented.

An optical fiber comprises a central core and a surrounding cladding. The refractive index of the cladding is less than that of the core. The core diameter is so small that light incident upon the core-cladding interface remains in the core by total internal reflections.

It is well-known that a light wave may be represented by a time-varying electromagnetic field comprising orthogonal electric and magnetic field vectors having a frequency equal to the frequency of the light wave. An electromagnetic wave propagating through a guiding structure can be described by a set of normal modes. The normal modes are the permissible distributions of the electric and magnetic fields within the guiding structure, for example, a fiber optic waveguide. The field distributions are directly related to the distribution of energy within the structure. The normal modes are generally represented by mathematical functions that describe the field components in the wave in terms of the frequency and spatial distribution in the guiding structure. The specific functions that describe the normal modes of a waveguide depend upon the geometry of the waveguide. For optical fiber, where the guided wave is confined to a structure having a circular cross section of fixed dimensions, only fields having certain frequencies and spatial distributions will propagate without severe attenuation. The waves having field components that propagate unattenuated are called normal modes. A single mode fiber will propagate only one spatial distribution of energy, that is, one normal mode, for a signal of a given frequency.

In describing the normal modes, it is convenient to refer to the direction of the electric and magnetic fields relative to the direction of propagation of the wave. If only the electric field vector is perpendicular to the direction of propagation, which is usually called the optic axis, then the wave is a transverse electric (TE) mode. If only the magnetic field vector is perpendicular to to the optic axis, the wave is a transverse magnetic (TM) mode. If both the electric and magnetic field vectors are perpendicular to the optic axis, then the wave is a transverse electromagnetic (TEM) mode.

None of the normal modes require a definite direction of the field components. In a TE mode, for example, the electric field may be in any direction that is perpendicular to the optic axis. The direction of the electric field vector in an electromagnetic wave is the polarization of the wave. In general, a wave will have random polarization in which there is a uniform distribution of electric field vectors pointing in all directions permissible for a given mode. If all the electric field vectors in a wave point in only a particular direction, the wave is linearly polarized. If the electric field consists of two orthogonal electric field components of equal magnitude phase shifted 90° from each other, the electric field is circularly polarized, because the net electric field is a vector that rotates around the propagation direction at an angular velocity equal to the frequency of the wave. If the two linear polarizations are unequal or phased other than 90° apart, the wave has elliptical polarization. In general, any arbitrary polarization can be represented by the sum of two orthogonal linear polarizations, two oppositely directed circular polarizations or two counter rotating elliptical polarizations that have orthogonal major axes.

The boundary between the core and cladding is a dielectric interface at which certain well-known boundary conditions on the field components must be satified. For example, the component of the electric field parallel to the interface must be continuous. A single mode optical fiber propagates electromagnetic energy having an electric field component perpendicular to the core-cladding interface. Since the fiber core has an refractive index greater than that of the cladding and light impinges upon the interface at angles less than or equal to the critical angle, essentially all of the electric field remains in the core by internal reflection at the interface. To satisfy both the continuity and internal reflection requirements, the radial electric field component in the cladding must be a rapidly decaying exponential function. An exponentially decaying electric field is usually called the evanescent field.

The velocity of an optical signal depends upon the refractive index of the medium through which the light propagates. Certain materials have different refractive indices for different polarizations. A material that has two refractive indices is said to be birefringent. The polarization of the signal propagating along a single mode optical fiber is sometimes referred to as a mode. A standard single mode optical fiber may be regarded as a two mode fiber because it will propagate two waves of the same frequency and spatial distribution that have two different polarizations. Two different polarization components of the same normal mode can propagate through a birefringent material unchanged except for a velocity difference between the two polarizations. Any polarized light can be represented by two circularly polarized waves having proper phase and amplitude, two either elliptically rotating components or perpendicular linearly polarized electric field components.

Bias error is the primary source of error in using fiber optic Sagnac rings as rotation sensors. The bias of a rotation sensor is the signal output when there is no signal input. If the bias is constant, then it may be substracted from the output signal when there is a signal input to determine the response of the rotation sensor to the input signal. However, the bias does not remain constant over time and temperature variations; therefore simply subtracting an error from the output of a rotation sensor is generally unsatisfactory.

SUMMARY OF THE INVENTION

The invention comprises an integrated optics chip which is the central module for an interferometric fiber optic gyroscope. The invention includes optical components formed on the integrated optics chip to perform the requisite functions for an interferometric fiber gyroscope in a manner that provides advantages over prior fiber optic rotation sensors. The present invention provides bias reduction, noise reduction, and improvement in scale factor linearity and repeatability.

The chip may be fabricated from an electro-optic material using conventional waveguide fabrication techniques such as titanium infusion into $LiNbO_3$. Three integrated optics waveguides form a Y-coupler in which a first waveguide forms the stem of the Y and the second and third waveguides form the legs. Light incident in the stem of the "Y" from a first optical fiber is split equally between the two legs of the "Y" and coupled into second and third optical fibers, respectively. Similarly, light incident upon the legs of the "Y" from the second and third fibers mixes in the stem of the "Y" and couples into the first fiber. The legs of the Y-coupler preferably differ in length by at least one coherence length of the light waves. The distance between the Y-coupler and the polarizing means formed on the stem is preferably greater than the depolarization length of the light waves.

The present invention includes means formed on the substrate for polarizing optical signals propagating in each of the three optical waveguides. The invention also includes means formed on the substrate adjacent the junction for modulating the birefringence of the junction. The invention further includes differential phase modulator means formed on the substrate for modulating the phase difference and the birefringence between optical waves propagating in the second and third waveguides. The invention also preferably includes means for modulating the birefringence of the waveguide that forms the stem of the Y-coupler.

The polarizing means preferably comprises a first metal film deposited on the surface of each waveguide adjacent its connection with the corresponding optical fiber. The polarizing means for each waveguide is preferably at least one depolarization length of the light from the respective adjacent edge of the substrate.

The means for modulating the birefringence of the junction preferably comprises a plurality of electrodes formed on the substrate. A first electrode is spaced apart from the junction of the waveguides. A second electrode is spaced apart from the junction of the waveguides such that the junction is between the first and second electrodes. A third electrode lies between the first and second electrodes over the junction of the three waveguides. The apparatus further includes means for applying electrical signals to the three electrodes to form two perpendicular electric field components in each of the three waveguides to adjust the refractive indices of the waveguides.

The differential phase modulating means also preferably comprises a plurality of electrodes formed on the substrate. A first electrode lies between the second and third waveguides. A second electrode is formed on the substrate such that the second waveguide is between the first and second electrodes. A third electrode is formed on the substrate such that the third waveguide is between the first and third electrodes. The present invention further includes means for applying a first electrical signal between the first and second electrodes to control a refractive index of the second waveguide and means for applying a second electrical signal between the first and third electrodes to control a refractive index of the third waveguide. The invention also preferably includes means for applying electrical signals to the electrodes for controlling the birefringence of the second and third waveguides.

The present invention comprises placing the coupling means a location at least one depolarization from the polarizer in the stem of the Y-coupler. The ends of the other two waveguides are polished at angles such that their lengths differ by more than one coherence wavelength, which for superluminescent diodes is approximately 50 $\mu$.

DESCRIPTION OF THE PREFERRED EMBODIMENT.

Figure 1:
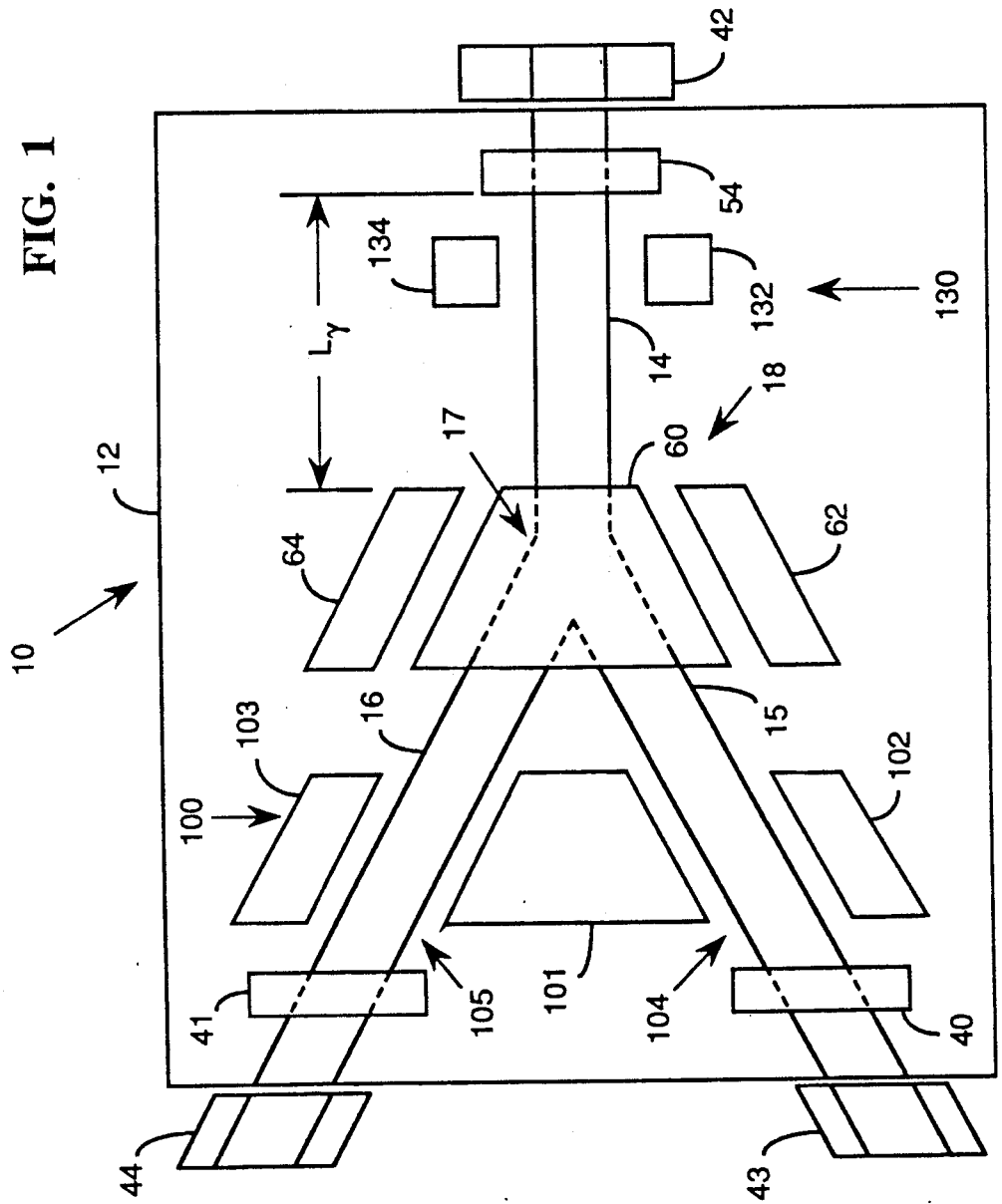
FIG. 1 illustrates a plan view of an integrated optics module according to the present invention showing optical components mounted on a substrate for forming a fiber optic rotation sensor.
Figure 4A:
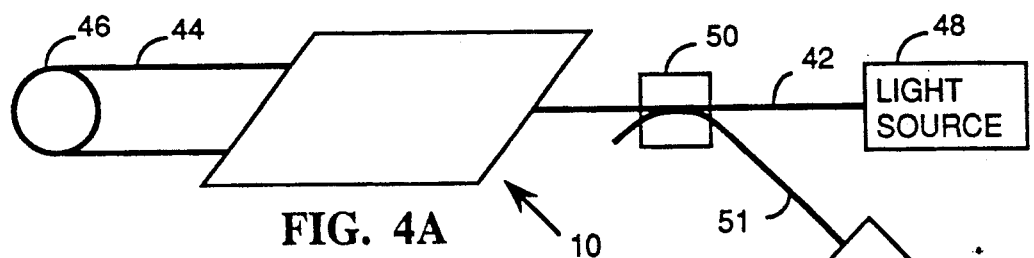
FIG. 4A schematically illustrates the integrated optics module according to the present invention used to form a fiber optic rotation sensor.
Figure 4B:
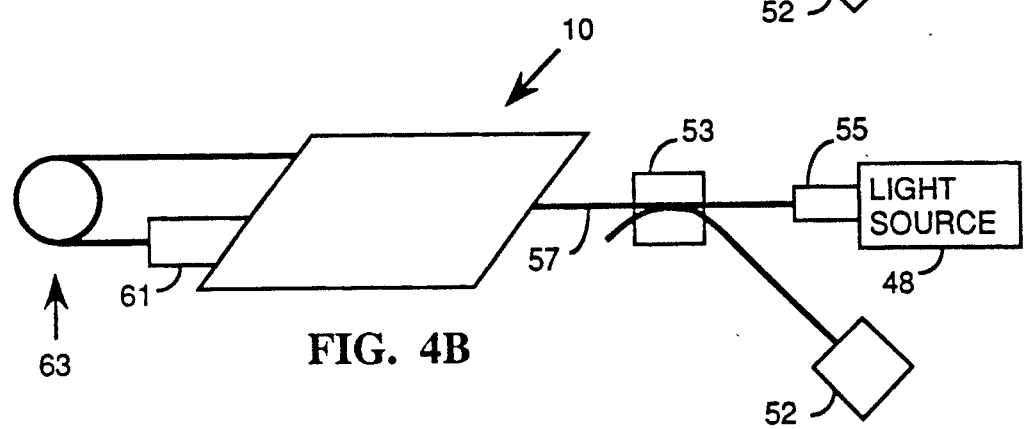
FIG. 4B schematically illustrates of the integrated optics module according to the present invention used to form a second embodiment of a fiber optic rotation sensor.
Figure 5A:
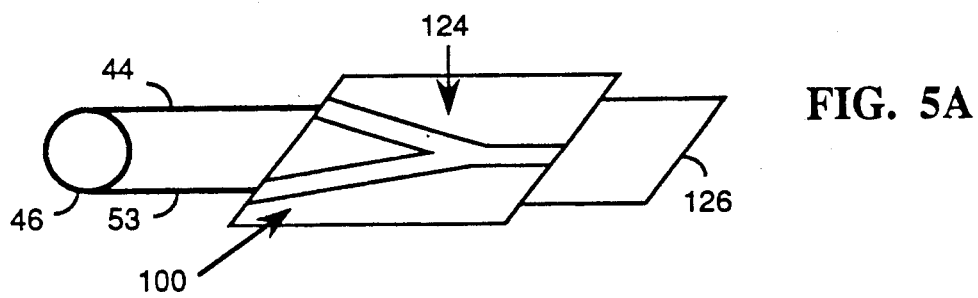
FIG. 5A is a top plan view of a non-reciprocal configuration of a fiber optic rotation sensor for low accuracy applications of the integrated optics module according to the present invention.

Referring to FIG. 1, an integrated optics module 10 according to the present invention includes an integrated optics chip or substrate 12 having three optical waveguides 14–16 formed therein. The substrate 12 is preferably formed of an electrooptically active material such as lithium niobate. However, the invention may be practiced using other substrate materials having refractive indices that are controllable. The substrate may be made to include a magnetooptically material, an acoustooptically active material or a thermooptically active material. The waveguides 14–16 intersect at a junction 17 to form a Y-shaped coupler 18. Optical components used in forming a rotation sensor 19 are formed on the substrate 12 and are described subsequently. Rotation sensors formed using the integrated optics module 10 are illustrated in FIG. 4A, 4B and 5A, which are described in detail subsequently.

Figures 8A, 8B:
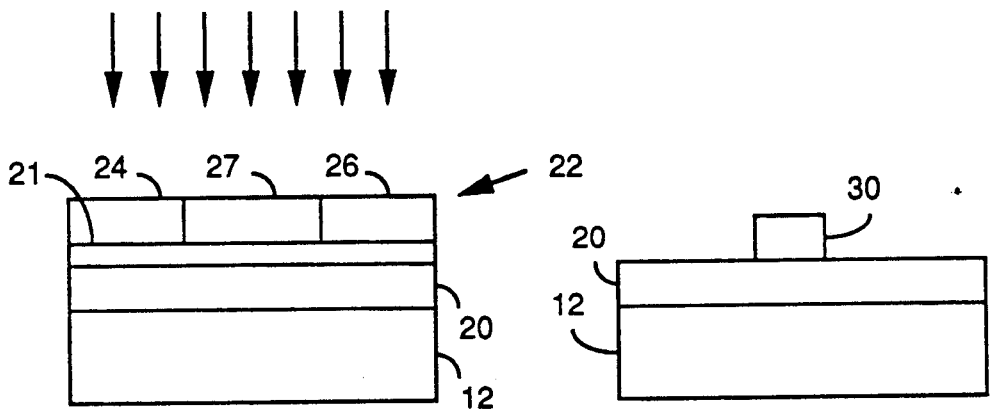
FIG. 8A-8E illustrate steps in forming an optical waveguide in the substrate of FIG. 1.

FIGS. 8A-8E illustrate formation of the optical waveguide 14 in the substrate 12. Initially the substrate 12 is covered with a metal layer 20 and then a photoresist layer 21. A glass photomask plate 22 is placed on the photoresist layer 20. The plate 22 is prepared by using standard photoreduction techniques to generate a desired pattern on which portions 24 and 26 are opaque and spaced apart to leave an elongate transparent rectangular portion 27. The arrows in FIG. 8A indicate ultraviolet (UV) light impinging upon the glass plate 22 and the exposed portion 27 of the photoresist layer 21. The portions 24 and 26 are opaque to the UV light so that the UV light affects only the exposed portion 27 of the photoresist layer 21. Referring to FIG. 8B, placing the photoresist portion 27 in a suitable developer leaves attached to the substrate 12 only a photoresist portion 30, which was immediately subjacent to the transparent region 27, respectively.

Figures 8C, 8D:
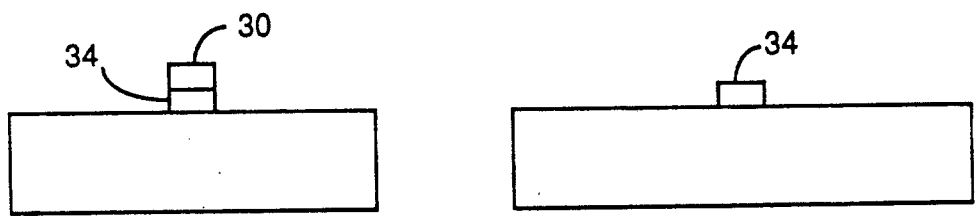
Figure 8E:
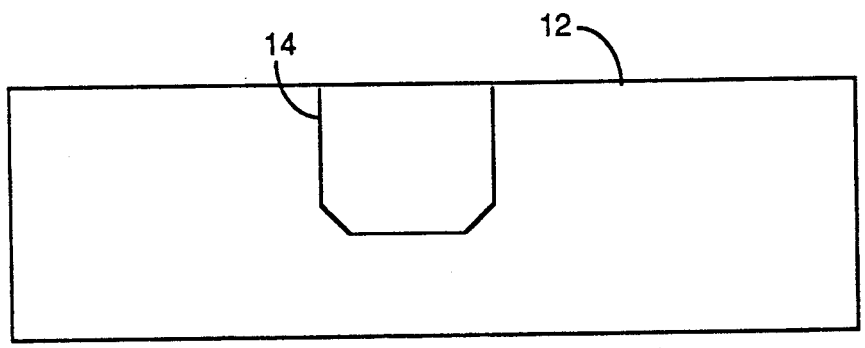

Referring to FIG. 8C, a titanium strip 34 is formed on the substrate 12 by placing the clip in a suitable etchant which removes the titanium except where it is protected by the photomask 30.

Placing the substrate 12 in a solvent such as acetone removes the photoresist portion 30, leaving only the well-defined layer 34 of titanium, shown in FIG. 8D, on the substrate 12. The layer 34 has a substantially rectangular cross section as viewed from the end as in FIG. 8D. The substrate 12 with the titanium layer 34 thereon is placed in a high temperature oven, as is well-known in the art, and baked a time sufficient to cause diffusion of $Ti^{++}$ ions into the substrate 12 to form the generally rectangular waveguide 14 shown in FIG. 8E.

Referring again to FIG. 1, the integrated optics module 10 may be used to form a fiber optic rotation sensor. In forming a rotation sensor optical fibers 42–44 may be butt-coupled to the waveguides 14–16, respectively. The optical fibers 42 and 43 may be separate fibers or they may be opposite ends of one fiber that is configured as a sensing loop 46, shown in FIG. 4A.

Light may propagate into the chip 12 from any of the optical fibers 42–44. Light incident upon the chip 12 from the fiber 42 couples into the waveguide 14, which forms the stem of the Y-shaped coupler 18. Upon reaching the junction of the waveguides 14–16, light input from the fiber 42 divides equally between the waveguides 15 and 16. Light incident upon the chip 12 from the fiber 43 couples into the waveguide 15 and then propagates to the junction 17 where it enters the waveguide 14. Similarly, light incident upon the chip 12 from the fiber 44 couples into the waveguide 16 and propagates to the junction 17. Light beams propagating toward the junction 17 in the waveguides 15 and 16 combine according to the well-known principle of superposition and propagate in the waveguide 14 toward the fiber 42.

Referring to FIG. 4A, a fiber optic rotation sensor 45 includes a light source 48 that provides light to the optical fiber 42, which is preferably a polarization maintaining fiber. The light source 48 may be a superluminescent diode (SLD). A polarization maintaining fiber has refractive indices that differ significantly for the two orthogonal linear polarizations. Ordinary optical fiber has refractive indices that are nearly equal for both polarizations. An electromagnetic wave may be characterized by a propagation constant that is a function of the refractive index of the medium in which the wave propagates. If the propagation constants for polarization components (polarization modes) in the same waveguide are nearly equal, energy readily couples between them. The result is a signal of varying polarization, which is undesirable in a rotation sensing system. Polarization maintaining fiber has propagation constants that differ sufficiently to prevent appreciable coupling between the two polarizations. Therefore the intensity of each polarization remains constant, and the net polarization is held constant.

Since the light input to the fiber 42 has polarization components along both of the fiber axes, both of these polarizations will propagate in the fiber without mixing together in the polarization maintaining fiber. The polarization maintaining fiber 42 may be formed by a variety of techniques described subsequently. Since all of the polarization maintaining fibers may be essentially identical, the subsequent description of such fibers refers only to the fiber 42. U.S. patent application Ser. No. 734,211, filed May 15, 1985 and issued as U.S. Pat. No. 4,717,225 and assigned to Litton Systems, Inc., owner of the present invention, discloses a structure and method of fabrication of a polarization maintaining optical fiber that may used in forming the rotation sensor 10. The disclosure of U.S. Pat. No. 4,717,225 is hereby incorporated by reference into this disclosure.

Since the velocity of light in the fiber 42 is $v=c/n$, where c is the speed of light in a vacuum and n is the refractive index of the fiber for the particular polarization under consideration, the two polarizations have different velocities in the fiber. The slow wave has velocity $v_s=c/n_x$, and the fast wave has velocity $v_f=c/n_y$, where $n_y<n_x$.

Figure 12:
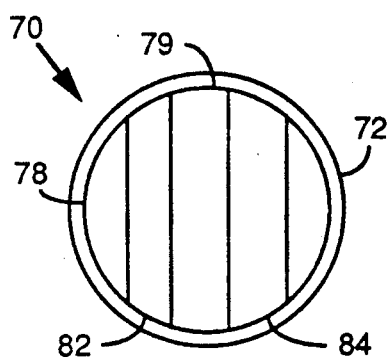
FIG. 12 is a cross sectional view of a polarization maintaining optical fiber that may be used with the integrated optics module according to the present invention to form a rotation sensor.

One type of polarization maintaining fiber has a layered core 70 and a surrounding cladding 72 as shown in FIG. 12. The core 70 has different refractive indices for waves of different polarization so that the propagation constants of the core are polarization-dependent. The core 70 and cladding 72 have refractive indices such that the cladding index is less than both core indices. Therefore, the polarization maintaining fiber guides light of both polarizations. Since the propagation constants of the core are different, or non-degenerate, for the two polarization, energy does not readily couple between them. Therefore, light propagated by the polarization maintaining fiber 42 experiences no change in polarization.

Figure 13:
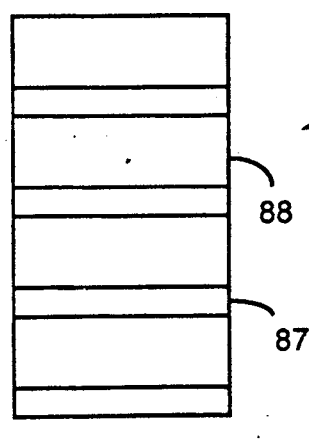
FIG. 13 illustrates a step in the formation of the polarization maintaining optical fiber of FIG. 12.

A core having birefringent properties can be synthesized by properly choosing materials for the core layers to have particular refractive indices and by properly choosing the fractional thicknesses $f_1$ and $f_2$ as shown in FIG. 13. Referring to FIG. 12, the core 70 is comprised of layers 78–80 of a first material and layers 82 and 84 of a second material having an index of refraction different from the first material. The core 70 may comprise many layers of the two materials, but only the five layers 78–80 and 82 and 84 are shown for convenience of illustration and explanation.

Unlike ordinary optical fibers, the form birefringent single mode fiber 42 will maintain the polarization state of a wave propagating therein. In the fiber 42 the difference between the refractive indices for the two polarizations is sufficiently large that there is a substantial difference between the propagation constants of waves having the two orthogonal polarizations. The difference between the propagation constants eliminates the degeneracy between the polarization states and prevents waves of one polarization from coupling to the other polarization under ordinary conditions. Coupling of energy between waves require that the waves have essentially the same velocity. If the velocities are different, there is no appreciable coupling between the two states.

Referring to FIG. 13, a method of fabricating a polarization maintaining fiber as shown in FIG. 12 involves first forming a stack 86 of alternating layers of materials 87 and 88 having different refractive indices. The stack 86 is heated to form an essentially monolithic block. The block may then be drawn through a succession of dies, or otherwise stretched by methods well-known in the art, to reduce its dimensions to values suitable for use as the core 70. Before drawing, the block may be ground to form a cylinder in order to produce a core having a circular cross section. A cladding having a refractive index less than both refractive indices of the core 70 may be added thereto by any of several standard techniques, such as fusing bulk silicon dioxide, $SiO_2$, onto the core, collapsing $SiO_2$ tubing onto the core, or by reactive deposition of $SiO_2$ from a gaseous mixture.

$GeO_2$ ($n_2=1.593$) may be used as the high index component and $SiO_2$ as the low index component in the stack 86. Both silica and germania are used in virtually all single mode and multimode fibers because of their low loss and physical compatibility. Combined inhomogeneously with proper fractional thickness they form the core 70 with both $n_x$ and $n_y$ being large enough to be clad by fused silica.

Well established optical fabrication techniques can be used to fabricate the $SiO_2$ plates from pure bulk $SiO_2$. The $GeO_2$ component may be too thin to be formed by mechanical fabrication techniques. The $GeO_2$ layer may be formed by sputtering a $GeO_2$ film onto an $SiO_2$ substrate. The $GeO_2$ layer may also be formed by coating the $SiO_2$ with a layer of Ge and oxidizing it to $GeO_2$ in a tube furnace.

Other types of high birefringence fiber suitable for use as the polarization maintaining fiber 42 are described in the following U.S. patents, the disclosures of which are hereby incorporated into the present disclosure:

U.S. Pat. No. 4,549,781 issued Oct. 29, 1985 to Bhagavatula et al. for Polarization-Retaining Single-Mode Optical Waveguide;

U.S. Pat. No. 4,529,426 issued Jul. 16, 1985 to Pleibel et al. for Method of Fabricating High Birefringence Fibers;

U.S. Pat. No. 4,465,336 issued Aug. 14, 1984 to Huber et al. for Waveguide and Method of Manufacturing Same; and U.S. Pat. No. 4,561,871 issued Dec. 31, 1985 to Berkey for Method of Making Polarization Preserving Optical fiber.

Light from the light source 48 is launched into the polarization maintaining fiber 42 by conventional means. The light then propagates to a coupler 50 where a portion of the incident light is coupled into the free end of a fiber 51. Light remaining in the fiber 42 then reaches the module 10 shown in detail in FIG. 1. The coupler 17 divides the source light essentially equally between the waveguides 15 and 16, which cooperate with the sensing coil 46 to form the clockwise and counterclockwise waves.

Referring again to FIG. 4A, the clockwise and counterclockwise waves traverse the sensing loop 46 and then combine at the junction 17 to form an interference pattern. The waves that form this interference pattern propagate in the waveguide 14 to the fiber 42. An optical coupler 50 formed in the fiber 42 couples part of the optical signal containing the interference pattern into a fiber 51 that guides the light to a detector 52. The detector 52 forms electrical signals indicative of the interference pattern. These electrical signals are then processed to determine the rotation rate and angular displacement. Processing circuitry for determining the rotation rate and angular displacement is described in U.S. patent application Ser. No. 031,323, the disclosure of which is hereby incorporated by reference into the present disclosure.

Referring to FIGS. 1 and 4A, light input to the waveguide 14 from the source 48 propagates through a first polarizer 54 formed on the substrate 12. The polarizer 54 may be fabricated from a metallic or dielectric and metallic overcoating on a localized region of the waveguide 14. Undesired polarization components in the light wave input to the waveguide 14 couple out of the waveguide 14 into the material that forms the polarizer 54. Light of the desired polarization remains in the waveguide 14. For simplicity in explaining the invention it is assumed that the desired polarization component lies in the plane of the substrate 12 and points toward the top of the page containing FIG. 1.

Figure 3:
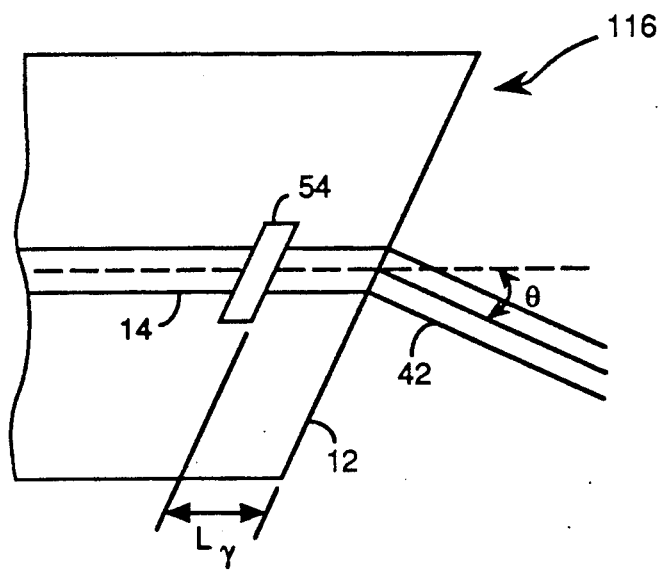
FIG. 3 illustrates a third optical fiber coupled to a third waveguide formed in the substrate.
Figure 11:
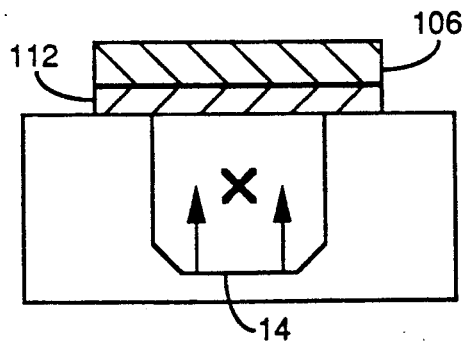
FIG. 11 is a cross sectional view of a polarizer that may be included in the integrated optics module of FIG. 1.

Since the polarizers 40, 41 and 54 are preferably essentially identical, only the polarizer 54 is described in detail herein. Referring to FIG. 11, a metal strip 106 is placed on the lithium niobate chip 12 over the waveguide 14. The metal strip 106 is preferably formed of aluminum. A dielectric buffer layer 112 may be placed between the strip 106 and the lithium niobate chip 12. The polarizer 54 passes the horizontally polarized component of incident light and attenuates the vertically polarized component. As shown in FIG. 3, the polarizer 54 is preferably placed so that the distance between it and the edge of the substrate 12 that abuts the fiber 42 is at least one depolarization length of the light output from the optical source 48. The depolarization length is the propagation distance required for the polarizations of the input light to lose correlation. In a preferred method of constructing a rotation sensor including the module 10, the polarizations passed between the polarizer 54 and the birefringence modulator 18 are decorrelated.

Figure 2:
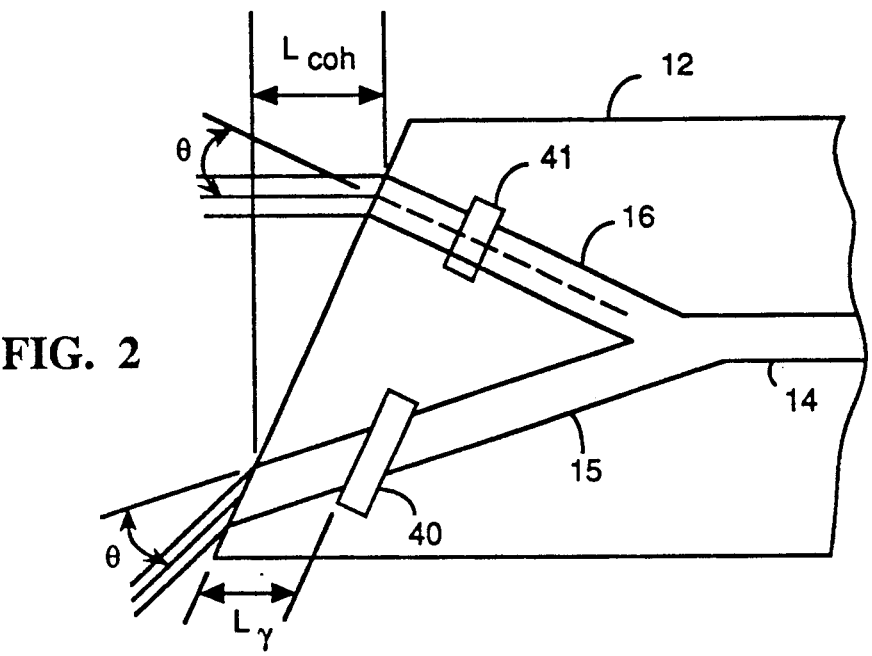
FIG. 2 illustrates a pair of optical fibers coupled to corresponding optical waveguides formed in the substrate of FIG. 1 and also shows a pair of polarizers formed on the substrate to polarize light propagating in the waveguides.

Similarly, referring to FIG. 2, the distances between the polarizers 40 and 41 and the adjacent edge of the substrate 12 should each equal the depolarization length of the light from the optical source 48. The edge of the subtrate 12 adjacent the polarizers 40 and 41 is preferably polished at an angle so that the waveguides 14 and 15 have different lengths. The difference of the lengths of the waveguides 14 and 15 is preferably greater than to the coherence length of the light output from the source 48 to prevent backward reflections from being correlated and producing an interference pattern and a bias error. The ends of the fibers 42-44 and the adjacent edges of the substrate 12 are preferably polished such that refraction at the interfaces between the fibers and the substrate are at the Brewster angle to minimize backward reflections.

Referring again to FIGS. 1 and 4A, after propagating past the polarizer 54 the light input to the module 10 from the source 48 propagates through a birefringence modulator 130, which is comprised of a pair of electrodes 132 and 134 formed on opposite sides of the waveguide 14. The birefringence modulator 130 controls the birefringence of the waveguide 14.

The light in the first waveguide 14 then propagates through a birefringence modulator 18. The birefringence modulator 18 and the polarizer 54 are preferably separated by a distance equal to the depolarization length of the light in the waveguide 14. The birefringence modulator 18 controls the refractive indices of the junction 17 for the two polarizations that may be guided thereby. The junction 17 has refractive indices that depend on the polarization of the light they may guide. If the direction of propagation is the y-axis, then the linear polarization components are along the x and z-axes. The refractive indices for a light wave in the waveguide are therefore written as $n_x$ and $n_y$. The difference between the refractive indices $n_x$ and $n_y$ for a waveguide is the birefringence of the waveguide.

Since the velocity of a light wave in the junction 17, for example, is $v = c/n$ where c is the free space speed of light, changing the refractive indices changes the speed of the wave in the region of the birefringence modulator 18. The transit time of the wave through the birefringence modulator 18 depends upon the speed of the wave. Therefore, changing the speed of a wave changes its transit time. Changes in the transit time are seen as changing the portion of the sinusoidal light wave that exists at the output end of the birefringence modulator 18. Therefore, changing the refractive indices changes or modulates the phase of the two linear polarizations of the light wave in a different manner. The birefringence modulators 18 and 55 provide a controllable phase retardation between the two linear polarizations of at least $2\pi$ radians can be achieved in the junction.

Figure 7:
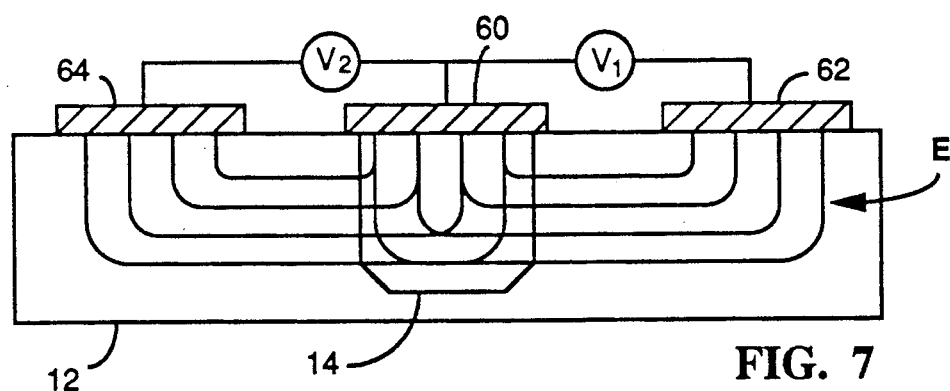
FIG. 7 is a first end elevation view of the birefringence modulator of FIG. 6 showing electric fields that are perpendicular to the upper surface of the module of FIG. 6 and that extend through a waveguide formed in the module.

Referring to FIGS. 1 and 6-8, the birefringence modulator 18 includes an electrode 60 placed directly over the junction 17 and adjacent parts of all three waveguide 14-16. The birefringence modulator 18 also includes a pair of electrodes 62 and 64 formed on the lithium niobate chip 12 on opposite sides of the electrode 60 and laterally displaced therefrom. Referring to FIG. 7, a first voltage source $V_1$ is connected between the center electrode 60 and the electrode 62 and a second voltage source $V_2$ is connected between the electrodes 60 and 64 to form electric fields in the junction 17. These electric fields also extend through the waveguides 14-16 in a manner similar to that shown for the junction 17.

As shown in FIG. 7, the electric fields from the electrodes 60 and 64 and 62 and 64 are perpendicular to the junction 17. Referring to FIG. 7, the field between the central electrode 60 and the electrode 62 is primarily vertical in the junction 17 as viewed in that Figure.

The substrate 12 is formed of an electrooptically active material such as lithium niobate, which has refractive indices of the form $n = n_0 + n_1(E)$, where $n_0$ is a constant component of the refractive index and $n_1(E)$ is a function of the applied electric field E. Since the electric field in the junction 17 is essentially in the vertical direction as viewed in FIG. 7, only the vertical component of the field affects the refractive index. Changes in the refractive of the junction 17 cause its effective optical length to change. Therefore, controlling the electric fields applied to the junction 17 provides means for controlling the difference between the refractive indices of the junction 17 for the two polarizations. The birefringence modulator 18 preferably is capable of adjusting the refractive indices of the junction 17 to provide a controllable phase retardation of at least $2\pi$ rad in the junction. Since the birefringence modulator 18 is mounted on the substrate 12 at the junction 17, the coupling region of the Y-coupler must have sufficient length to permit the application of electric fields adequate to provide the $2\pi$ rad retardation. The birefringence modulator 18 and the polarizer 54 cooperate to reduce noise and bias error in a fiber optic rotation sensor that includes the module 10.

Figure 9:
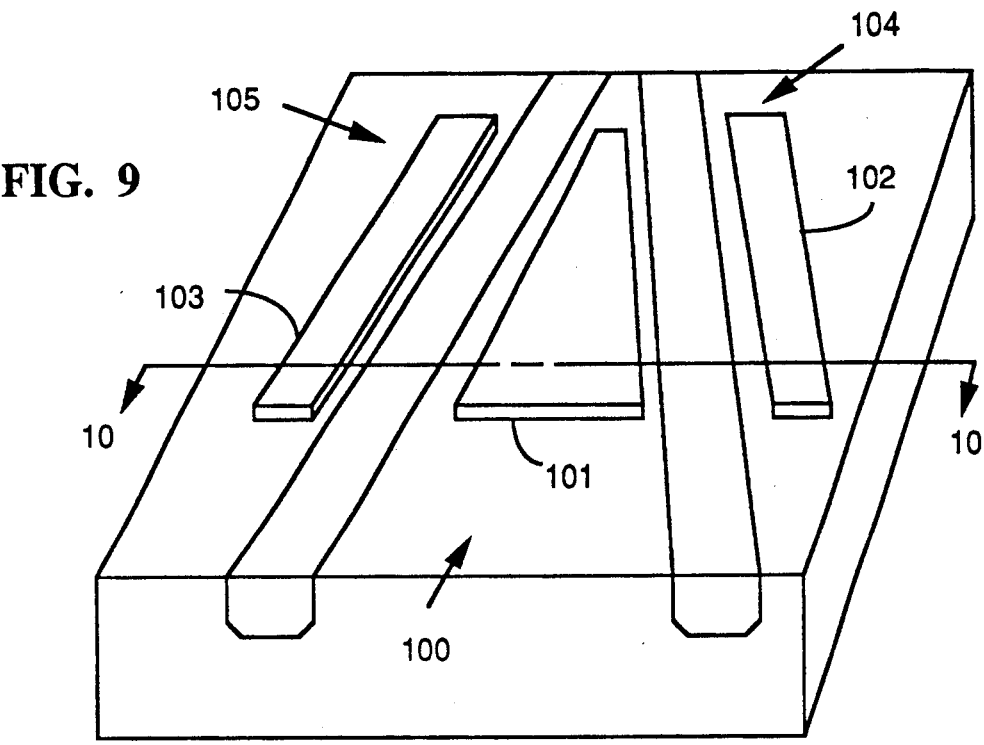
FIG. 9 is a perspective view of a differential phase modulator that may be formed in the integrated optics module according to the present invention in the present invention.
Figure 10:
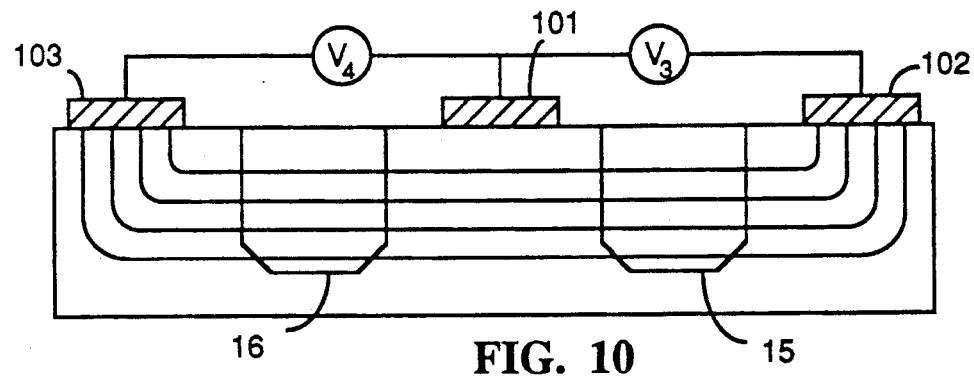
FIG. 10 is a cross sectional view of the differential phase modulator of FIG. 9.

Referring to FIGS. 1, 9 and 10, light propagating in the waveguides 15 and 16 passes through a differential phase modulator 100. The differential phase modulator 100 includes three electrodes 101-103 mounted to the substrate 12. The electrode 101 is mounted between the waveguides 15 and 16. The electrodes 102 and 103 are mounted to the substrate 12 so that the waveguide 15 is between the electrodes 101 and 102 and the waveguide 16 is between the electrodes 101 and 103. The electrode pairs 101 and 102 and 101 and 103 each comprise a phase modulator 104 and a phase modulator 105, respectively. In combination the two phase modulators serve to provide a difference in the phase of light propagating in the two waveguides 15 and 16.

Since the phase modulators 104 and 105 have substantially identical structures, only the phase modulator 104 is described in detail. Referring to FIGS. 10 and 11, the phase modulator 104 comprises a portion of the optical waveguide 15 and the electrodes 101 and 102. The electrodes 101 and 102 may be formed on the substrate 12 by vapor deposition of aluminum. Application of a voltage across the electrodes 101 and 102 produces a horizontal electric field in the waveguide 15 and changes its refractive index 15 by means of the electro-optic effect as explained above for the birefringence modulator. The transit time of a light wave through the phase modulator 104 is the product of the length of the waveguide 15 affected by the electrodes 101 and 102 and the refractive index of the waveguide 15 divided by the speed of light in vacuum. Because of the sinusoidal nature of the electromagnetic fields that comprise the light wave, the change in transit time is seen as a change in phase of the wave. The differential phase modulator 100 permits the use of a serrodyne technique for closed loop operation of a fiber optic rotation sensor.

In the differential phase modulator 100 the phase of the light is advanced in one of the waveguides 15 or 16 and retarded in the other. The light in the waveguide 15 then propagates through a second polarizer 40 before reaching the optical fiber 43. The light in the waveguide 16 propagates through a third polarizer 41 before reaching the optical fiber 44. The fibers 43 and 44 may be butt coupled to the substrate so that the fiber cores are aligned with the waveguides to transfer light therebetween, but the present invention is not limited to this type of coupling. The second and third polarizers 40 and 41 apply identical polarization effects to light guided by the waveguides 15 and 16, respectively. The differential phase modulator 100 and the polarizers 40 and 41 cooperate to ensure high scale factor linearity and repeatability.

The differential phase modulator 100 may also be operated as a birefringence modulator. Application of suitable voltages to the electrodes 101-103 permits controllable changes to be made in the birefringence of the waveguides 15 and 16.

Referring to FIG. 2, the left edge of the integrated module of the present invention preferably is angle polished such that the lengths of two waveguides 15 and 16 extending from the coupling region 17 differ in length by more than one coherence length $L_{coh}$ of the light guided thereby. For a super luminescent diode (SLD) light source the coherence length is approximately 50 μm. The ends of the fibers 43 and 44 are so polished that refraction from the waveguide into the fiber or vice versa satisfy Snell's Law to maximize transmission at the fiber/waveguide interfaces. In addition, the second and third polarizers, 40 and 41 are preferably located that the distance from the polarizer to the adjacent edge 114 of the substrate 12 where the fibers 43 and 44 couple to the waveguides 15 and 16, respectively, is at least one depolarization length ($L\gamma$).

Referring to FIG. 3, the polarizer 54 is also preferably located at least one depolarization from the edge 116 of the substrate 12. The edge 116 and the end of the fiber 42 adjacent the edge 116 are also chosen so that Snell's Law is satisfied to obtain maximum transmission.

The optical fiber 42, the polarizer 54 and the birefringence modulators 18 and 55 act together to reduce noise and bias error in the fiber optic rotation sensors formed using the integrated optics module 10. The differential phase modulator 100 permits implementation of a serrodyne technique for closed loop operation of the fiber optic gyroscope. The differential phase modulator may be used to control the birefringence of each of the waveguides 15 and 16 and to control the difference of the birefringence of these waveguides. The second and third polarizers 40 and 41 are used to ensure proper operation of the differential phase modulator 100 by ensuring that only one polarization passes through the modulator. The polarizers 40 and 41 ensure high scale factor linearity and repeatability by filtering out the unwanted polarization.

FIG. 4A illustrates operation of the invention with polarized light. A polarization maintaining directional coupler 50 guides light from the optical source 48 to the module 10. The principle axes of the polarization maintaining fiber 42, 43 and 44 are aligned with the principle axes of the waveguides 14-16 in the integrated optics module 10 and normal to the p-n junction (not shown) in the superluminescent diode 48. This configuration gives maximum optical signal throughput from the superluminescent diode 48 to the photodetector 52.

The light input to the module 10 divides at the junction 17 and propagates out to the second optical fiber 43 and the third optical fiber 44. Upon exiting the integrated optics module 10 the light forms inputs to the sensing coil 46, which is also formed of polarization maintaining fiber for polarized operation of the invention. The two light beams exiting the module 10 become counterpropagating light beams in the sensing coil 46. After traversing the sensing coil 46 and undergoing a phase shift indicative of the rotation rate of the coil 46 about a line through the plane of the coil, the light waves re-enter the integrated optics module 10.

The two light beams reenter the integrated optics module 10 at the waveguides 15 and 16. The wave entering waveguide 15 propagates past the polarizer 40 and the differential phase modulator 100 before reaching the junction region 17. The wave entering waveguide 16 propagates past the polarizer 41 and the differential phase modulator 100 before reaching the junction region 17 where the two waves recombine. The birefringence modulator 18 controls the birefringence of the junction 17. The differential phase modulator 100 also functions as a birefringence modulator. The recombined waves form an interference signal pattern that is indicative of the Sagnac phase shift of the waves in the sensing coil 46. After combining in the junction 17, the waves propagate through the birefringence modulator 130 and the polarizer 54. Therefore, birefringence modulation is provided at the junction 17 and in each of the waveguides 14-16.

The signal carrying the interference pattern propagates beyond the birefringence modulator to the polarizer 54 the stem 14, through the first polarizer 12, and into the optical fiber 42. The directional coupler 50 couples the signal into an optical fiber 51, which guides the signal to a photodetector 52. The photodetector 52 produces an electrical signal indicative of the intensity of the interference pattern of the light propagating out of the gyroscope 45.

Changes in rotation of the gyroscope 45 change the intensity of the interference pattern, which in turn changes the intensity of the electrical signal produced by the photodetector to indicate the intensity of the interference pattern.

FIG. 4B illustrates operation of the invention with unpolarized light. In FIG. 4B a length of polarization maintaining fiber 55 receives light from the optical source 48. The polarization maintaining fiber is butt-coupled to a single mode fiber 57, which then guides the light to a single mode coupler 53. Some of the light propagates in the in the fiber 57 to the module 10. A length of polarization maintaining fiber 61 is mounted between the waveguide 15 and a sensing coil 63, which is formed of ordinary single mode fiber. The polarization maintaining fibers 55 and 61 preferably have lengths of 1 to 10 meters.

The principle axes of the two polarization maintaining fiber lengths 55 and 61 are oriented at 45° and to the semiconductor junction in the light source 48 to the principle axes of the waveguide 15 in the module. This configuration gives an additional 6 db of loss from the light source 48 to the photodetector 52 beyond the loss associated with operation of the invention with polarized light as described above with reference to FIG. 4A. This configuration shown in FIG. 4B however, can use conventional single mode fiber coils 63 and components, which can reduce the cost of the instrument.

The integrated module 10 of FIG. 1 can be used in any fiber optic gyroscope structure. If only polarized operation is required, the second and third polarizers 40 and 41 can be omitted. If high bias errors are acceptable, then the birefringence modulator 18 can be omitted. The differential phase modulator 100 may be operated as a birefringence modulator to provide control of the birefringence of the waveguides 15 and 16. The birefringence modulator 130 controls the birefringence of the waveguide 14. If high bias errors are acceptable, then the differential phase modulator 100 and the birefringence modulator 130 provide adequate control of the birefringence in the module 10. If still higher fiber levels of bias error permitted in the particular application, then the polarizer 54 can also be omitted.

Figure 5B:
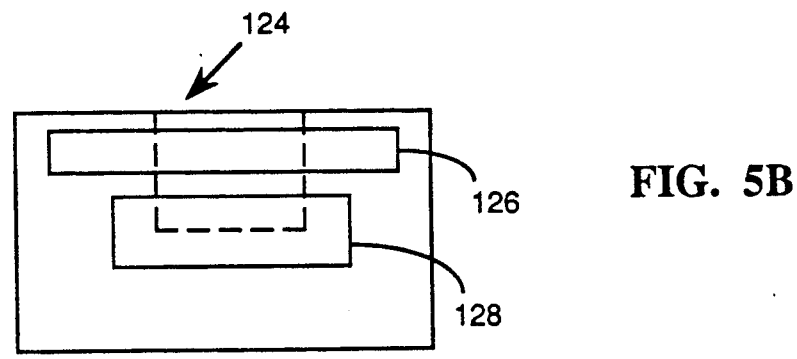
FIG. 5B is an end elevation view of the apparatus of FIG. 5A.
Figure 6:
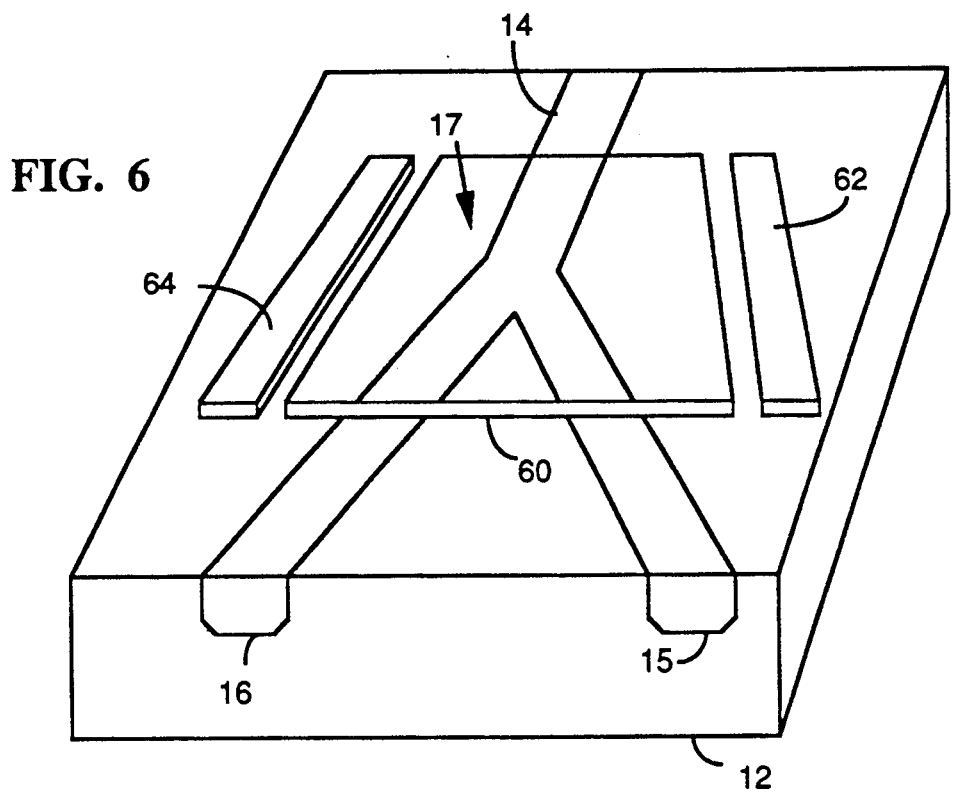
FIG. 6 is a perspective view of a birefringence modulator that may be formed on the integrated optics module according to the present invention.

Referring to FIG. 5, a nonreciprocal configuration can be used for the lowest accuracy applications. In this configuration, an optical source 126 and a photodetector 128 are attached to the right edge of an integrated module 124, which contains only the waveguides 14–16, coupler 18, and the differential phase modulator 100. Referring to FIG. 5B, the optical source is mounted directly on the end of the waveguide 14. The edge of the module may be angle polished to minimize loss and backreflections. The detector is located below the optical source to intercept the nonreciprocal wave from the waveguide 14. This configuration can be advantageous in high acceleration environments due to the small number of optical interconnects required.

One or more of the devices described with reference to FIG. 1 for providing birefringence modulation may be included in the device of FIG. 5 if needed to reduce the non-reciprocities.

What is claimed is:

1. An integrated optics module for mounting between an optical fiber that receives light from an optical source and an optical fiber sensing coil for forming a passive Sagnac ring optical rotation sensor, comprising:
   a substrate formed of an optically active material having controllable refractive indices;
   a plurality of optical waveguides formed in the substrate and connected at a junction to form a coupler, a first one of the waveguides being configured for connection to the optical fiber receiving optical signals from the optical source, second and third waveguides being configured for connection to opposite ends of the optical fiber sensing coil;
   means connected to the substrate for polarizing optical signals propagating in each of the first, second and third optical waveguides;
   means connected to the substrate over the junction for modulating the birefringence of the junction; and
   means connected to the substrate over a portion of the first waveguide for modulating the birefringence thereof; and
   differential phase modulator means connected to the substrate for modulating the phase difference between optical waves propagating in the second and third waveguides and for modulating the birefringence of the second and third waveguides.

2. The integrated optics module of claim 1 wherein the polarizing means comprises:
   a first metal film connected to the first waveguide adjacent the connection between the first waveguide and the optical fiber;
   a second metal film connected to the second waveguide adjacent the connection between the second waveguide and optical fiber sensing coil; and
   a third metal film connected to the third waveguide adjacent the connection between the third waveguide and the optical fiber sensing coil.

3. The integrated optics module of claim 1, wherein the means for modulating the birefringence of the junction comprises:
   a first electrode connected to the substrate and spaced apart from the junction of the waveguides;
   a second electrode connected to the substrate and spaced apart from the junction of the waveguides such that the junction is between the first and second electrodes;
   a third electrode connected to the substrate between the first and second electrodes over the junction of the first, second and third waveguides;
   means for applying electrical signals to the first, second and third electrodes to form an electric field component in the junction that is perpendicular to the substrate at the junction; and
   means for controlling the electrical signals to adjust the difference between the refractive indices of the junction.

4. The integrated optics module of claim 3 wherein the differential phase modulating means comprises:
   a fourth electrode connected to the substrate between the second and third waveguides;
   a fifth electrode connected to the substrate such that the second waveguide is between the fourth and fifth electrodes;
   a sixth electrode connected to the substrate such that the third waveguide is between the fourth and sixth electrodes;
   means for applying a first electrical signal between the fourth and fifth electrodes to control a refractive index of the second waveguide; and
   means for applying a second electrical signal between the fourth and sixth electrodes to control a refractive index of the third waveguide.

5. The integrated optics module of claim 4 wherein the means for modulating the birefringence of the first, second and third waveguides comprises:
   a pair of birefringence modulating electrodes connected to the substrate on opposite sides of the first waveguide;

means for applying electrical signals to the fourth and fifth electrodes to modulate the birefringence of the second waveguide; and means for applying electrical signals to the fourth and sixth electrodes to modulate the birefringence of the third waveguide.

6. The integrated optics module of claim 1 wherein the polarizing means includes:

a first polarizer connected to the first waveguide and positioned such that light input to the first waveguide travels in the first waveguide a distance of at least one depolarization length of the light output from the optical source before reaching the first polarizer, the first polarizer being separated from the junction by a distance of at least one depolarization length of the light guided by the first waveguide;

a second polarizer connected to the second waveguide and positioned such that light input to the second waveguide travels in the second waveguide a distance of at least one depolarization length of the light output from the optical source before reaching the second polarizer; and a third polarizer connected to the third waveguide and positioned such that light input to the third waveguide travels in the third waveguide a distance of at least one depolarization of the light output from the optical source length before reaching the third polarizer.

7. The integrated optics module of claim 6 wherein a length of the first waveguide equal to at least one depolarization length of the light of the light output from the optical source is placed between the birefringence modulator and the first polarizer.

8. The integrated optics module of claim 1 wherein the second and third waveguides have lengths that differ by at least the coherence length of the light output from the optical source.

9. A rotation sensor, comprising:
an integrated optics module that includes:
a substrate formed of an optically active material having controllable refractive indices;
first, second and third optical waveguides formed in the substrate and connected at a junction to form a coupler; and
differential phase modulator means connected to the substrate for modulating the phase difference between optical waves propagating in the second and third waveguides;
an optical source connected to the first waveguides for supplying optical signals thereto;
a fiber optic sensing coil connected to the first and second waveguides for guiding counterpropagating waves that form an interference pattern indicative of rotations of the sensing coil about a sensing axis;
means connected to the substrate adjacent the junction for modulating the birefringence of the junction of the first, second and third waveguides; and
means connected to the substrate for modulating the birefringence of each of the first, second and third waveguides.

10. The rotation sensor of claim 9 wherein the means for modulating the birefringence of the junction of the waveguides comprises:
a first electrode connected to the substrate and spaced apart from the junction of the waveguides;

a second electrode connected to the substrate and spaced apart from the junction of the waveguides such that the junction is between the first and second electrodes;

a third electrode connected to the substrate between the first and second electrodes over the junction of the first, second and third waveguides;

means for applying electrical signals to the first, second and third electrodes to form two perpendicular electric field component in the junction of the waveguides; and means for controlling the electrical signals to adjust the refractive indices of the junction.

11. The rotation sensor of claim 10 wherein the differential phase modulating means comprises:

a fourth electrode connected to the substrate between the second and third waveguides;

a fifth electrode connected to the substrate such that the second waveguide is between the fourth and fifth electrodes;

a sixth electrode connected to the substrate such that the third waveguide is between the fourth and sixth electrodes;

means for applying a first electrical signal between the fourth and fifth electrodes to control a refractive index of the second waveguide; and means for applying a second electrical signal between the fourth and sixth electrodes to control a refractive index of the third waveguide.

12. The rotation sensor of claim 11 further including means for applying electrical signals to the fourth, fifth and sixth electrodes to modulate the birefringence of the second and third waveguides.

13. The rotation sensor of claim 9 further including:
a polarization maintaining fiber mounted between the optical source and the first waveguide for guiding light between the source and the module; and
a polarization maintaining fiber optic directional coupler formed in the polarization maintaining fiber for coupling light from the polarization maintaining fiber for input to the detecting means.

14. The rotation sensor of claim 13 including second and third polarizers spaced apart from the connections between the fiber optic coil and the second and third waveguides, respectively, a distance of at least one depolarization of the light output from the optical source.

15. The rotation sensor of claim 13 wherein a length of the first waveguide equal to at least one depolarization length of the light of the light output from the optical source lies between the birefringence modulator and the first polarizer.

16. An integrated optics module for mounting between an optical fiber that receives light from an optical source and a optical fiber sensing coil for forming an optical rotation sensor, comprising:
a substrate formed of an optically active material having controllable refractive indices;
a plurality of optical waveguides formed in the substrate and connected at a junction to form a coupler, a first one of the waveguides being configured for connection to the optical fiber for receiving optical signals from the optical source, a second one of the waveguides and a third one of the waveguides being configured for connection to opposite ends of the optical fiber sensing coil;

differential phase modulator means for modulating the phase difference between optical waves propagating in the second and third waveguides;

means for modulating the birefringence of the first waveguide; and means for modulating the birefringence of the junction.

17. The integrated optics module according to claim 16 further comprising means for modulating the birefringence of the second and third waveguides.

* * * * *